United States Patent
Guey et al.

(10) Patent No.: US 8,934,930 B2
(45) Date of Patent: Jan. 13, 2015

(54) ADAPTATION OF PARAMETERS IN A COMMUNICATION NETWORK

(75) Inventors: Jiann-Ching Guey, Fremont, CA (US); Dennis Hui, Sunnyvale, CA (US)

(73) Assignee: Telefonaktiebolaget L M Ericsson, Stockholm (SE)

( * ) Notice: Subject to any disclaimer, the term of this patent is extended or adjusted under 35 U.S.C. 154(b) by 554 days.

(21) Appl. No.: 13/283,003

(22) Filed: Oct. 27, 2011

(65) Prior Publication Data
US 2013/0109421 A1    May 2, 2013

(51) Int. Cl.
| | | |
|---|---|---|
| *H04B 7/00* | (2006.01) | |
| *H04W 24/02* | (2009.01) | |
| *H04W 24/04* | (2009.01) | |
| *H04W 92/24* | (2009.01) | |
| *H04L 12/911* | (2013.01) | |
| *H04W 92/20* | (2009.01) | |

(52) U.S. Cl.
CPC .............. *H04W 24/02* (2013.01); *H04W 24/04* (2013.01); *H04W 92/24* (2013.01); *H04L 47/822* (2013.01); *H04W 92/20* (2013.01)
USPC ........... 455/507; 455/445; 455/453; 455/446; 455/524; 455/426.1; 370/237; 370/238; 370/238.1; 370/310; 370/312

(58) Field of Classification Search
CPC ..... H04W 24/02; H04W 24/04; H04W 92/20; H04W 92/24
USPC .............. 455/507, 453, 445, 446, 422.1, 403, 455/550, 500, 517, 426.1, 426.2, 508, 515, 455/524, 525, 67.11; 370/237, 238, 238.1, 370/310, 312, 328, 400, 406
See application file for complete search history.

(56) References Cited

U.S. PATENT DOCUMENTS

| | | | |
|---|---|---|---|
| 2004/0266442 A1 | 12/2004 | Flanagan et al. | |
| 2009/0073893 A1* | 3/2009 | Vu Duong et al. | ............ 370/253 |
| 2010/0034157 A1 | 2/2010 | Stolyar et al. | |
| 2011/0176433 A1 | 7/2011 | Monogioudis | |

* cited by examiner

*Primary Examiner* — Keith Ferguson
(74) *Attorney, Agent, or Firm* — Coats and Bennett, PLLC

(57) ABSTRACT

A distributed parameter update procedure is provided for updating parameters that do not have discrete values. When a parameter value is changed, a search is conducted of a parameter space to find a new parameter value minimizes some cost function. The cost function is derived based on the current parameter settings in neighboring nodes. The distributed parameter update procedure may simplify the search process by localizing the search of the parameter space for a new parameter value to the vicinity of the current parameter setting. In some embodiments, the search is conducted along a line of steepest descent emanating from the current parameter setting.

38 Claims, 6 Drawing Sheets

ADAPTATION OF PARAMETERS IN A COMMUNICATION NETWORK

BACKGROUND

The present invention relates generally to the configuration of a cellular communication network and, more particularly, to a method of self-configuration of parameter settings for a cellular communication network.

In a mobile communication network, the coverage area of the network is divided into a plurality of cells. Conventionally, the configuration of cells and the assignment of certain parameters are set during cell planning and remain static once the system is deployed. As an example, frequencies may need to be assigned to the cells in a manner to reduce interference between cells. This requirement usually means that the same frequency is not reused in neighboring cells. As another example, the cells may be assigned locally unique reference signals (RSs), which are used by the mobile terminal to identify the cells and synchronize to the network.

The assumption that the network topology will remain static once a system is deployed is no longer true. It is now common for cells to be added or subtracted from a network after the system is deployed. For example, pico cells or other low power cells may be deployed in some areas of the network in order to improve coverage. Also, home base stations may be deployed in areas where network coverage is already provided. As new cells are added or subtracted, a different set of neighbor cell relationships is created.

Some mechanism is needed in order to prevent parameter conflicts between neighboring cells when new cells are deployed. For example, a new cell should not be assigned frequencies or RS patterns that conflict with existing assignments. Conventionally, the network administrator can manually assign parameters to the new cells in order to avoid conflicts. However, this is becoming increasingly more difficult as the number of cells in the network increases. In some cases, the network administrator must reconfigure existing cells in order to avoid conflicts. The cell planning that precedes the deployment of new cells can therefore be costly and time-consuming.

One way to simplify deployment of new cells is to make the network self-configuring in as many aspects as possible. U.S. patent application Ser. No. 13/072,496 filed Mar. 25, 2011 which is incorporated by reference herein in its entirety, discloses a general framework for updating system parameters when new cells are deployed. This patent application describes a distributed parameter update procedure based on the exchange of impact functions between neighboring cells. An impact function is a function describing how changes in a parameter setting of a first cell will affect a neighboring cell. When a parameter setting is updated by a cell, the cell exchanges impact functions with its neighboring cells. After the exchange of impact functions, the updating cell can compute a new parameter setting that minimizes the cumulative impact on its neighboring cells. A similar technique is used in other cells, so that as a whole the system gradually converges to an optimum or near optimum result.

The technique described above can be applied to a wide range of system parameters. In cases where the parameter setting is limited to a finite number of discrete values, the impact function can be easily tabulated and exchanged among cells. For a continuous parameter, such as transmit power, the same formulation can be used only if the parameter is quantized. If the quantization step is too large, quantization error may lead to performance degradation. If the quantization step is too small, the large amount of data to be exchanged among cells may exceed the capacity of the inter-cell connection or incur excessive delay.

Accordingly, there remains a need for a distributed parameter update procedure for updating parameters that can have continuous values.

SUMMARY

Particular embodiments of the present invention provide methods and apparatus for updating, in a distributed manner, parameters of a network node that can have a continuous (non-discrete) value. When a parameter value is changed, a search is conducted of a parameter space to find a new parameter value that minimizes some cost function. The cost function is derived based on the current parameter settings in neighboring nodes. Certain embodiments of the present invention simplify the search process by localizing the search of the parameter space for a new parameter value to the vicinity of the current parameter setting. In some embodiments, the search is conducted along a line of steepest descent emanating from the current parameter setting.

Exemplary embodiments of the invention comprise a distributed parameter update method implemented by a network node in a mobile communication network. The method may be performed iteratively by the network node. In one exemplary method, a network node receives current parameter settings for each of one or more neighboring nodes in its local network. The current parameter settings may comprise settings computed in the previous iteration of the process. The network node then computes a gradient of a summed cost function for network node. The summed cost function is a function of the current parameter settings for the network node and the neighboring nodes in its local network. The network node then determines a revised parameter setting by searching the parameter space along the gradient of the summed cost function for a solution that minimizes the summed cost function. Once the new parameter value is determined, the network node sends its new parameter setting to the neighboring nodes in its local network. After exchanging new parameter settings with its neighbor nodes, the process may be repeated.

In another exemplary embodiment, the network node receives current parameter settings for each of one or more neighboring nodes in its local network. After receiving the current parameter settings, the network node determines a summed cost function as a function of the current parameter settings for network node and its neighboring nodes The network node then computes a gradient of the summed cost function for the network node. The network node then determines a revised parameter setting by searching the parameter space along the gradient of the summed cost function for a solution that minimizes the summed cost function. Once the new parameter value is determined, the network node sends its new parameter setting to the neighboring nodes in its local network. After exchanging new parameter settings with its neighbor nodes, the process may be repeated.

In another exemplary embodiment, the network node exchanges current parameter settings with the neighboring nodes in a local network of the network node. The network node then computes a partial derivative of a local cost function with respect to each of its neighboring nodes. A separate instance of the local cost function is computed for each neighboring node. Once the partial derivatives are computed, they are exchanged with the neighboring nodes. The network node then computes a gradient of a summed cost function at its current parameter setting based on the partial derivatives received from its neighboring nodes. The computed gradient is exchanged with the neighboring nodes. In the exchange, the network node receives gradients computed by each of its neighboring nodes. After this exchange, the network node computes a local impact function based on the gradients. A separate instance of the local impact function is computed for each of the neighboring nodes. The network node exchanges the local impacts functions with its neighboring nodes. After the exchange, the network node computes a summed impact function as a weighted sum of the impact functions of the network node and its neighboring nodes. The network node determines a new parameter setting based on the summed impact function and the gradient of the summed cost function. The new parameter value for the network node is then sent to the neighboring nodes. After exchanging new parameter settings with its neighbor nodes, the process may be repeated.

Other embodiments of the invention comprise a network node configured to implement the distributed parameter update procedures described above. In one embodiment, the network node comprises an interface circuit for communicating with one or more neighboring nodes in a local network of the network node, and a configuration processor for determining a parameter setting for the network node. The configuration processor is configured to implement the methods described as described above.

Certain embodiments of the present invention enable the use of a distributed parameter update procedure for parameters that can have a continuous value. The use of local impact functions in some embodiments requires the exchange of less information between network nodes as compared to a full description of the cost functions. Thus, bandwidth is conserved and latency is reduced. Further, the search of the parameter space is restricted to a line extending from the current parameter setting requires fewer processing resources.

DETAILED DESCRIPTION

Figure 1:
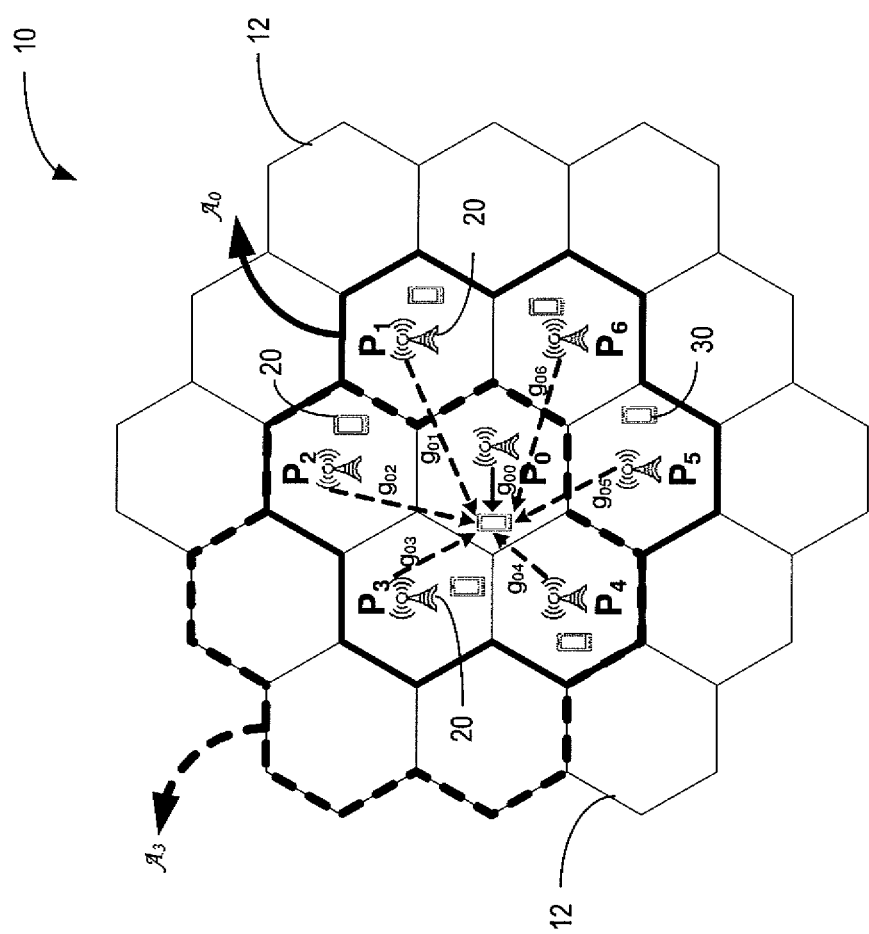
FIG. 1 illustrates an exemplary communication network implementing a distributed parameter update procedure.

Referring now to the drawings, FIG. 1 illustrates a cellular communication network 10 implementing a distributed parameter update procedure. The geographic area covered by the communication network 10 is divided into a plurality of cells 12. Each cell corresponds to a node 20. The nodes 20 may comprise base stations that provide service to user terminals 30 in their respective cells 12. In some instances, the nodes 20 may comprise user terminals 30 capable of peer-to-peer communications. For convenience, the cells 12 are shown as being of equal size and being arranged in a hexagonal pattern. Those skilled in the art will appreciate, however, that the size of the cells 12 may vary and that the coverage area of the cells 12 may overlap.

In the communication network 10, the nodes 20 may need to adapt a parameter, such as transmit power, responsive to short-term changes in the communication network 10. The parameter setting in each cell 12 will affect neighboring cells. For example, if a node 20 transmits at high power, it creates interference in the neighboring cells 12, which decreases capacity in the neighboring cells 12. On the other hand, if the node 20 transmits at a low power, it may be operating at less than maximum capacity. It should be noted that transmit power is a parameter that can have a continuous value between a minimum value (e.g., 0) and a maximum value.

A distributed parameter update procedure is used to coordinate the parameter settings between cells 12 in order to optimize some aspect of network performance. For example, the distributed parameter update procedure could be used to determine transmit power settings for the nodes 20 to maximize system capacity. The distributed parameter update procedure uses impact functions that describe how parameter settings in one cell 12 affects its neighboring cells 12. In the parameter update procedure, each node 20 computes a set of impact functions that describes how the parameter settings in neighboring cells 12 affects its own cell 12 and exchanges the impact functions with its neighboring cells 12. The node 20 in each cell 12 uses the impact functions received from nodes 20 in neighboring cells 12 to determine its own parameter setting.

Figure 2:
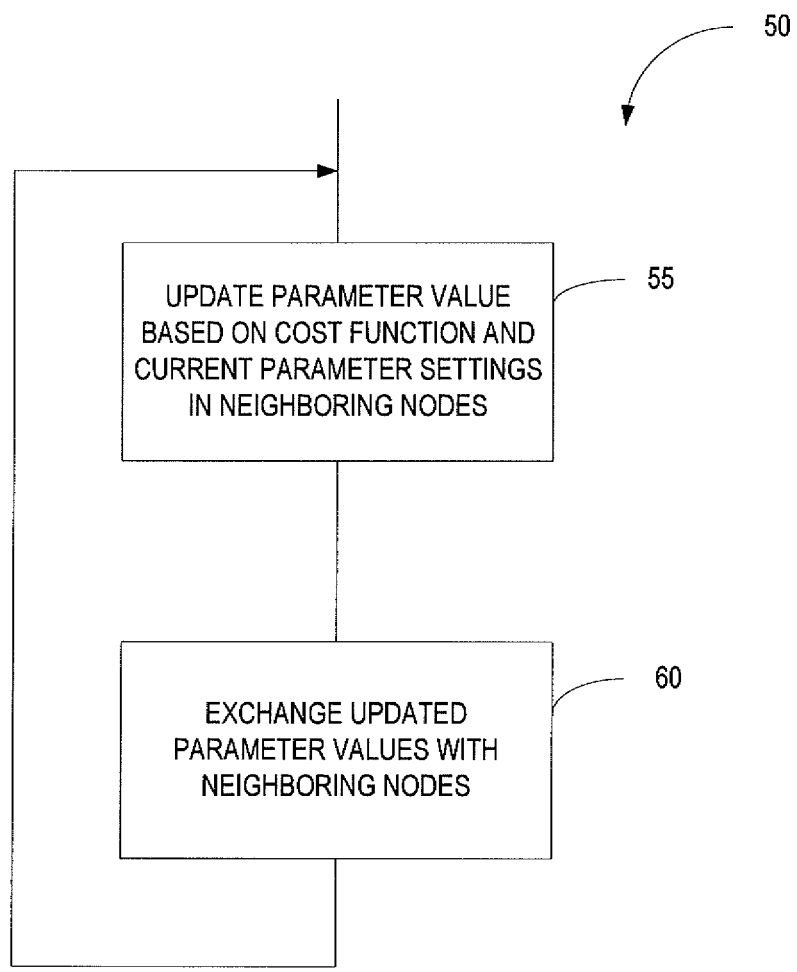
FIG. 2 illustrates a first exemplary distributed parameter update procedure.

FIG. 2 illustrates a distributed parameter update procedure 50. The distributed parameter update procedure 50 is an iterative process that begins with the updating of a parameter by each node 20 based on the current parameter settings and cost functions exchanged between the nodes 20 (block 55). After updating the parameter, the nodes 20 exchange the updated parameter settings (block 60).

The distributed update procedure 50 applies in a straightforward way to parameters that have a finite set of discrete values. However, application of the distributed parameter update procedure to parameters that can have a continuous value is more difficult. Examples of continuous value parameters include the transmit power of a node 20 and antenna weights for nodes 20 in a multiple-input, multiple output (MIMO) system with multiple antennas. One of the problems in applying the distributed parameter update procedure to such parameters is the exchange of cost functions. For continuous variables, the amount of information needed to fully describe the cost function makes the exchange of information costly in terms of bandwidth and latency. Another problem is that the parameter space is quite large. Performing a full search of the parameter space for an optimum solution would be time-consuming and would require significant processing resources.

In one or more embodiments of the present invention, a node 20 restricts its search of the parameter space to a one dimensional subspace in the vicinity of the current parameter setting. In one exemplary embodiment, a node 20 searches the parameter space along a line of steepest descent emanating from the current parameter setting. This approach reduces the amount of information required to describe the behavior of the cost function in the vicinity of the current parameter setting, and requires less information to describe than the full cost function. Therefore, it is possible to apply the distributed parameter update technique to variables that have continuous values.

Introducing the notation used in the remainder of this description, each cell 12 in the communication network 10 is identified by a unique index i, and a one-to-one correspondence between nodes 20 and cells 12 is assumed. At a given time instant n, a parameter vector $p_i$ associated with node i can be set by the node to adapt to changes in the surrounding environment. If the parameter is the transmit antenna weights in a MIMO system, it can be set to any complex number. If the parameter is the transmit power of a node 20, it can be set to any non-negative number. By convention, variables are denoted by bold face type and the values it takes by normal lower case letters, such as $p_i^n$, where the superscript n indicates the time index.

Each node i has a list of neighboring nodes determined by a proximity measure such as distance or intensity of radio interference. The determination of the neighboring nodes is not a material aspect of the invention, and techniques for determining neighbor sets are well-known in the art. In general, the neighbor set is determined based on received signal measurements. Nodes whose signal strength measurements exceed a threshold are included in the neighbor set. The set of neighboring nodes of node i is denoted $\mathcal{N}_i$. It is assumed that the neighbor relationship is reciprocal, i.e., $j \in \mathcal{N}_i$ if and only if $i \in \mathcal{N}_j$. The union of the neighbor set $\mathcal{N}_i$, with node i is referred to as the local network with respect to node i and is denoted $\mathcal{A}_i$.

Each node i can communicate with its neighboring nodes in $\mathcal{N}_i$ to exchange parametric information required to evaluate a cost function defined for its local network $\mathcal{A}_i$. The cost function is given by $$C_{\mathcal{A}_i(ip_j \in \mathcal{A}_i)} = C_{\mathcal{A}_i(p_i, p_j | j \in \mathcal{N}_i)} \quad \text{Eq. (1)}$$

After exchanging information with its neighboring nodes, each node i computes a new parameter value that minimizes a summed cost function given by:

$$p_i^{n+1} = \underset{p_i}{\mathrm{argmin}} \sum_{j \in \mathcal{A}_i} w_j C_{\mathcal{A}_j}(p_i | p_k = p_k^n, \forall k \in \mathcal{A}_j - \{i\}) \quad \text{Eq. (2)}$$

That is, each node i searches the parameter space and selects its parameter value as the one that minimizes the weighted sum of the cost functions corresponding to the local networks of the nodes in $\mathcal{A}_i$ (the local network of the central node i), assuming all other parameters remain the same as previously communicated at time instant n. The updated parameter value is then communicated to the neighboring nodes while at the same time the updated parameter values of neighboring nodes are also received.

For continuous parameters, such as transmit power, a search over the entire parameter space for the optimum solution of $p_i$ would be computationally complex and time-consuming. Instead of searching over the entire parameter space for a globally optimum solution of $p_i$ as described above, a simplified search may be implemented wherein the search of the parameter space is made in each iteration along the direction of the steepest descent. This approach restricts the optimization problem to a local one that is easier to define and thus more efficiently communicated between neighboring nodes.

Figure 3:
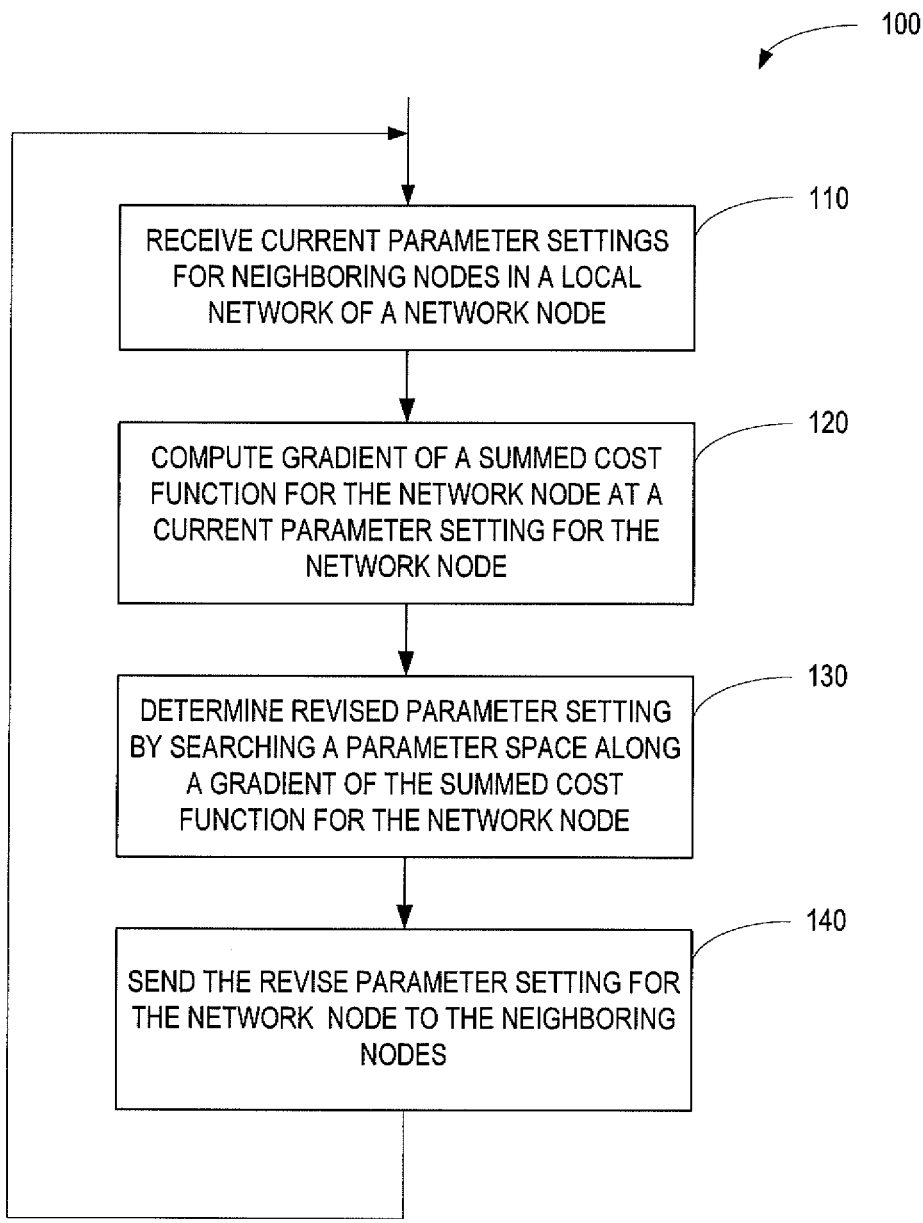
FIG. 3 illustrates a second exemplary distributed parameter update procedure for updating parameters.

FIG. 3 illustrates a generalized distributed update procedure 100 implemented by the network nodes 20 according to embodiments of the invention. The distributed parameter update procedure 100 is an interactive process. Network node i receives current parameter settings for each of one or more neighboring nodes in its local network $\mathcal{A}_i$ (block 110). The current parameter settings are those computed in the previous iteration. Network node i then computes a gradient of a summed cost function $C_i^n(p_i)$ for network node i (block 120). The summed cost function $C_i^n(p_i)$ is a function of the current parameter settings for network node i and the neighboring nodes $\mathcal{N}_i$ in its local network $\mathcal{A}_i$. Network node i then determines a revised parameter setting by searching the parameter space along the gradient of the summed cost function for the solution that minimizes the summed cost function (block 130). Once the new parameter value is determined, the network node i sends its new parameter setting to the neighboring nodes $\mathcal{N}_i$ in its local network $\mathcal{A}_i$ (block 140). After exchanging new parameter settings with its neighbor nodes $\mathcal{N}_i$, the process is repeated.

In a first exemplary embodiment, the summed cost function given in Eq. (2) is rewritten as:

$$C_i^n(p_i) = \sum_{j \in \mathcal{A}_i} w_j C_{\mathcal{A}_j}(p_j | p_k = p_k^n, \forall k \in \mathcal{A}_j - \{i\}) \quad \text{Eq. (3)}$$

The dependence on the neighbor nodes' parameter is dropped to highlight the fact that the cost function is a function of its own parameter variable $p_i$. By convention, the parameter $p_i$ is a column vector if it consists of more than one variable. The gradient of the cost function in Eq. (2) is a row vector given by:

$$\nabla C_i^n(p_i) \equiv \frac{\partial C_i^n(p_i)}{\partial p_i} = \left[ \begin{array}{cc} \frac{\partial C_i^n(p_i)}{\partial p_{i,1}} & \frac{\partial C_i^n(p_i)}{\partial p_{i,2}} & \cdots \end{array} \right] \quad \text{Eq. (4)}$$

The elements of Eq. (4) are partial derivatives of the summed cost function with respect to the corresponding variables in the parameter vector. The gradient evaluated at $p_i^n$ is $$(\gamma_i^n)^T = \nabla C_i^n(p_i^n) \equiv \frac{\partial}{\partial p_i} C_i^n(p_i) \bigg|_{p_i = p_i^n} \quad \text{Eq. (5)}$$

where $(\ )^T$ is the vector (or matrix) transpose. Therefore, the gradient $\gamma_i^n$ is a column vector with the same dimension as the parameter $p_i$.

In this embodiment, it is presumed that the cost function is known and that the gradient of the cost function can be evaluated at the current parameter value. The distributed parameter update procedure updates the parameter value by searching for a better solution than the current one along the direction of a line segment defined by $p_i^n - \gamma_i^n \alpha$, where $\alpha$ is a nonnegative scalar. The scalar a that may be upper bounded by the constraints of the problem. In other words, the network node i seeks the a value that minimizes the cost function:

$$\tilde{\alpha} = \underset{\alpha}{\mathrm{argmin}} C_i^n(p_i^n - \gamma_i^n \alpha) \quad \text{Eq. (6)}$$

The network node i then computes the new parameter value according to:

$$p_i^{n+1} = p_i^n - \gamma_i^n \tilde{\alpha} \quad \text{Eq. (7)}$$

The updated parameter values are then exchanged among neighboring nodes before the next iteration cycle starts.

Figure 4:
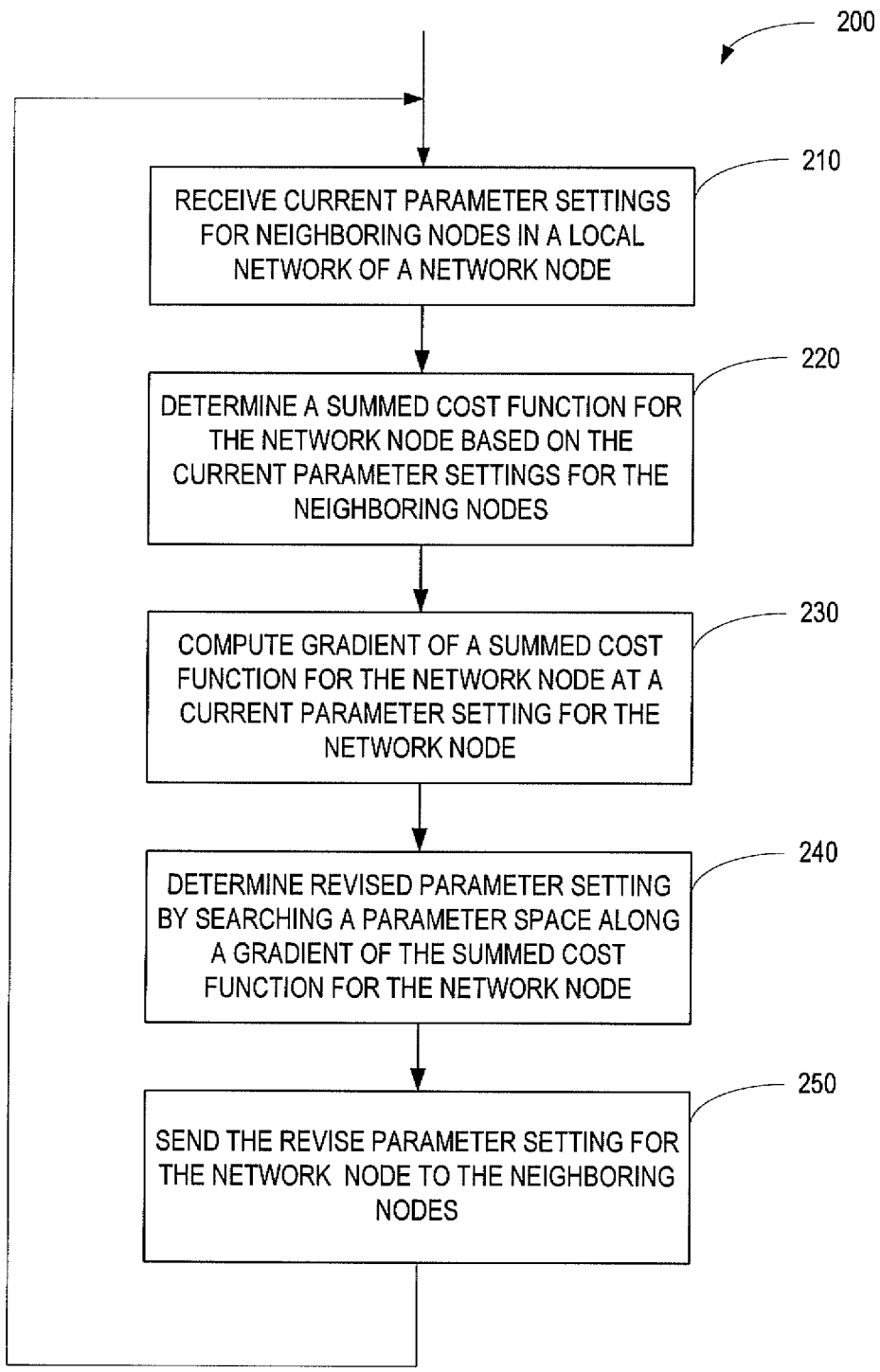
FIG. 4 illustrates a third exemplary distributed parameter update procedure for updating parameters.

FIG. 4 illustrates a method 200 of determining a parameter setting in the situation where the cost functions for the neighboring nodes $\mathcal{N}_i$ are known or can be determined. Network node i receives current parameter settings for each of one or more neighboring nodes $\mathcal{N}_i$ in its local network $\mathcal{A}_i$ (block 210). After receiving the current parameter settings, network node i determines a summed cost function according to Eq.

(3) given the current parameter settings (block 220). Network node i then computes a gradient of the summed cost function $C_i^n(p_i)$ for network node i (block 230). The gradient may be computed according to Eq. (5). Network node i then determines a revised parameter setting by searching the parameter space along the gradient of the summed cost function for the solution that minimizes the summed cost function (block 240). Once the new parameter value is determined, the network node i sends its new parameter setting to the neighboring nodes $\mathcal{N}_i$ in its local network $\mathcal{A}_i$ (block 250).

In many cases, each parameter $p_i$ is also constrained to be in a feasible set $S_i$. In this case, a function projecting the perturbed parameter value onto $S_i$ may be used. In cases where the parameter value is limited to a predefined set, the parameter is given by:

$$p_i^{n+1} = Q_{S_i}(p_i^n - \gamma_i^n \tilde{\alpha}) \quad \text{Eq. (8)}$$

where $Q_{S_i}$ denotes a projection function onto the set $S_i$. For example, when $p_i$ represents the transmit power of node i, $S_i=[0, P_{max,i}]$ represents the interval of feasible power levels of node i, where $P_{max,i}$ denotes the maximum transmit power level of node i. In one embodiment, the projection function $Q_{S_i}$ is given by:

$$Q_{S_i}(x) = [P_{max,i} - [P_{max,i} - x]^+]^+. \quad \text{Eq. (9)}$$

where:

$$[x]^+ = \begin{cases} x & \text{if } x \geq 0 \\ 0 & \text{if } x < 0 \end{cases}. \quad \text{Eq. (10)}$$

The evaluation of the summed cost function given in Eq. (3) requires knowledge of the individual cost functions $C_{\mathcal{A}_j A_j}$ for all nodes $j \in \mathcal{A}_i$. If this information is not available at node i, it needs to be communicated from the neighboring nodes $\mathcal{N}_i$. This exchange may be too costly in terms of bandwidth or latency if the cost functions are very complicated, or if the cost functions do not have a functional form (i.e., cannot be represented by an Eq.). Moreover, the cost function may change as network topology or propagation environment evolves over time, making the exchange of local cost functions even more inefficient.

Fortunately, the steepest descent approach requires only knowledge of the cost function along the line of gradient in the neighborhood of the current parameter values. This restricted function of a single variable, referred to herein as the "local cost function," is easier to describe than the functional form of the cost function. Therefore, in a second embodiment of the invention, each network node i exchanges information describing its local cost function in the vicinity of its current parameter setting with its neighboring nodes.

In the second embodiment, each node i first computes the partial derivative $g_{j \to i}^{n+1}$ of its local cost function for each of its neighboring nodes. The partial derivative may be computed according to:

$$g_{j \to i}^{n+1} = \frac{\partial}{\partial p_j} C_{\mathcal{A}_i}(p_j \mid p_k = p_k^n, \forall k \in \mathcal{A}_i - \{j\}) \bigg|_{p_j = p_j^n} \quad \text{Eq. (11)}$$

After exchanging the partial derivatives, each node i will have sufficient information to compute its search direction. The search direction can be computed according to:

$$\gamma_i^{n+1} = \sum_{j \in \mathcal{A}_i} w_j g_{i \to j}^{n+1} \quad \text{Eq. (12)}$$

Once the search direction is determined, it is then communicated to the neighboring nodes $\mathcal{N}_i$. That is, each node i exchanges the computed search direction computed in Eq. (12) with each of its neighboring nodes $\mathcal{N}_i$. The exchanged search direction information is used at each node i to determine a local impact function for each of its neighboring nodes $\mathcal{N}_i$. In one embodiment, the local impact function is computed according to:

$$I_{j \to i}^{n+1}(\alpha) = C_{\mathcal{A}_i}(p_j^n - \gamma_j^{n+1} \alpha \mid p_k = p_k^n, \forall k \in \mathcal{A}_i - \{j\}) \quad \text{Eq. (13)}$$

This local impact function describes the contribution of the parameter set by each neighboring node $\mathcal{N}_i$ to the summed cost function $C_{\mathcal{A}_i}$ of node i. Since it is a scalar function of a single variable $\alpha$, it can be more concisely represented than the local cost function itself. A separate instance of the local impact function is computed for each neighboring node $\mathcal{N}_i$.

After exchanging the local impact functions with it neighboring nodes $\mathcal{N}_i$, the network node i can compute a summed impact function describing how changes to its own parameter setting will impact its neighboring nodes $\mathcal{N}_i$. The network node i seeks the $\alpha$ value that minimizes the following summed impact function:

$$\tilde{\alpha} = \underset{\alpha}{\operatorname{argmin}} \sum_{j \in \mathcal{A}_i} w_j I_{i \to j}^{n+1}(\alpha) \quad \text{Eq. (14)}$$

The network node i then computes the new parameter value according to:

$$p_i^{n+1} = p_i^n - \gamma_i^{n+1} \tilde{\alpha}. \quad \text{Eq. (15)}$$

The updated parameter values are then exchanged among neighboring nodes and the next iteration of the distributed parameter update and the process is repeated using the new parameter settings.

Figure 5:
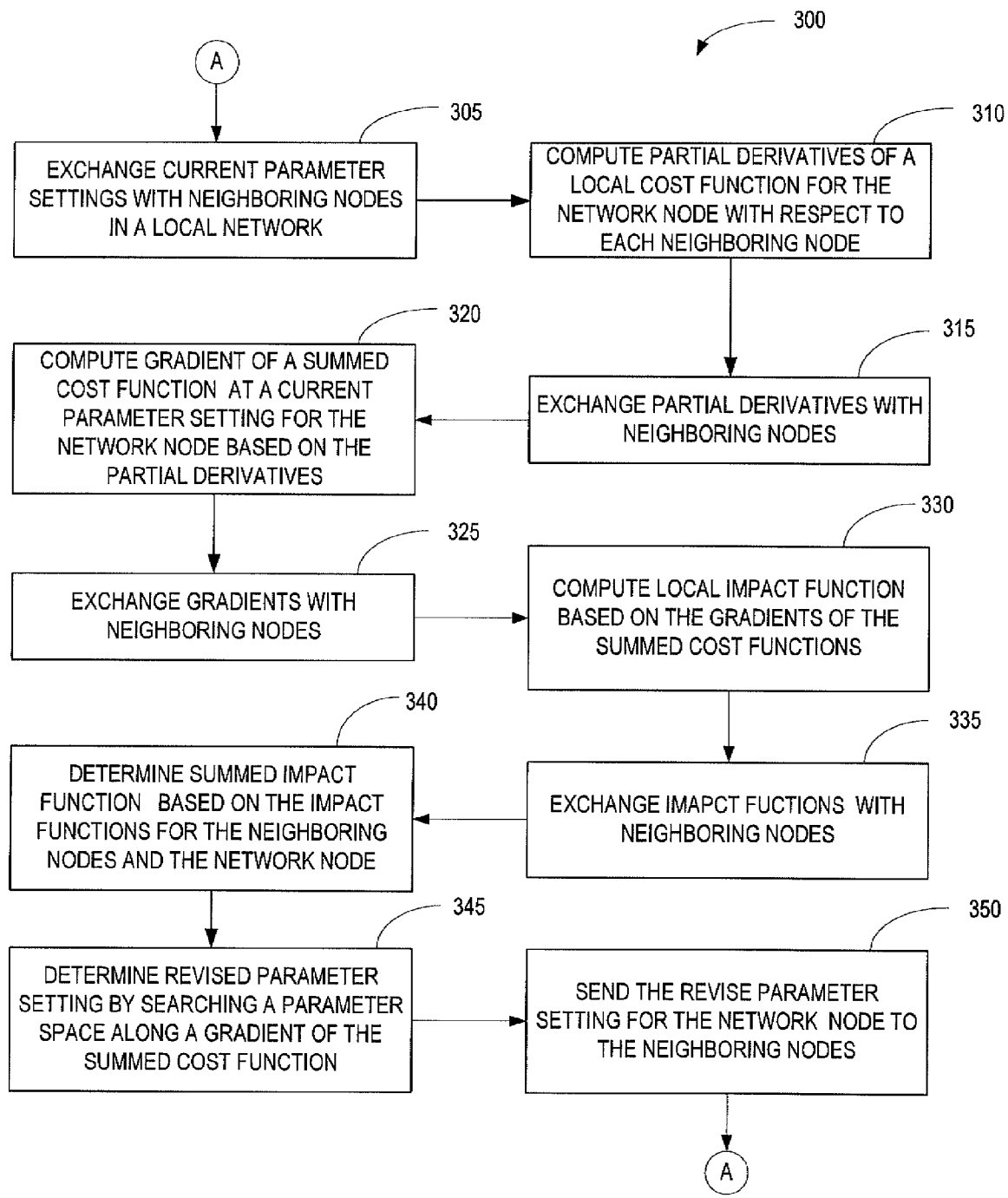
FIG. 5 illustrates a fourth exemplary distributed parameter update procedure for updating parameters.

FIG. 5 illustrates a method 300 of determining a parameter setting in the situation where the cost functions for the neighboring nodes $\mathcal{N}_i$ are not known. Network node i exchanges current parameter settings with the neighboring nodes $\mathcal{N}_i$ in a local network $\mathcal{A}_i$ (block 305). The network node i then computes a partial derivative of a local cost function $C_{\mathcal{A}_i}$ with respect to each of its neighboring nodes (block 310). The partial derivative may be computed according to Eq. (11). A separate instance of the local cost function $C_{\mathcal{A}_i}$ is computed for each neighboring node $\mathcal{N}_i$. Once the partial derivatives are computed, they are exchanged with the neighboring nodes $\mathcal{N}_i$ (block 315). The network node i then computes a gradient of a summed cost function at its current parameter setting based on the partial derivatives received from its neighboring nodes $\mathcal{N}_i$ (block 320). The gradient may be computed according to Eq. (12). The computed gradient is exchanged with the neighboring nodes (block 325). In the exchange, node i receives gradients computed by each of its neighboring nodes. After this exchange, the network node i computes a local impact function according to Eq. (13) based on the gradients (block 330). A separate instance of the local impact function is computed for each of the neighboring nodes. The network node i exchanges the local impacts functions with its neighboring nodes (block 335). After the exchange, the network node i possesses a local impact function describing how changes in its parameter setting will affect each of its neighboring nodes. The weighted sum of these impact functions yields a summed impact function of the variable α (block 340). The network node i determines a new parameter setting based on the summed impact function and the gradient of the summed cost function (block 345). More particularly, the network node searches for the value of α that minimizes the summed impact function and computes the new parameter value according to Eq. (14) and Eq. (15). The new parameter value for the network node is then sent to the neighboring nodes (block 350).

In the embodiment shown in FIG. 5, the way that the impact function is represented needs to be agreed upon before the information exchange takes place. There may be several ways to represent the impact function. A straightforward solution is to sample the function and exchange the (possibly quantized) sample values. Alternatively, the function can be approximated by its Taylor series expansion and the nodes 20 can then exchange a selective number of significant coefficients. In any case, there may be a phase in the coordination process in which the formats of the impact functions are communicated and agreed upon. This phase can occur as often or as infrequent as needed. With this setup/update phase, the subsequent exchanges of information among neighbor nodes may be further reduced by passing only the search direction as opposed to the impact function.

A practical example of a particular embodiment of the present invention will now be described to illustrate one possible use of the invention. Power control is a commonly encountered problem in a cellular network. If a node is transmitting at very high power, it may create too much interference to neighboring cells. If its transmit power is set too low, it may not be operating at its maximal potential. Ideally, a central node can be employed to coordinate the transmit power from the multiple cells so that the overall network-wise capacity is maximized while maintaining a certain minimal quality of service for the individual cells. In practice, however, such a central node may not be available and a distributed solution is needed.

FIG. 1 illustrates a local network $\mathcal{A}_i$ centered on node $P_0$, which for purposes of this example is assumed to be a base station. The neighbor set $\mathcal{N}_0$ for node $P_0$ includes nodes $P_1$, $P_2$, $P_3$, $P_4$, $P_5$, and $P_6$. A user terminal being served by node $P_0$ receives its desired signal with a power level of $p_0 g_{00}$, where $p_0$ is the transmit power of node $P_0$ and $g_{00}$ is the path gain between node $P_0$ and the user terminal. In addition, it also receives interference from at least the six cells 12 in its neighbor list at a level of $p_j g_{0j}$, where $p_j$ is the transmit power of neighboring node j and $g_{0j}$ is the path gain between neighboring node j and the user terminal. Based on the information available to node $P_0$, the capacity of the user terminal it serves is given by:

$$R = \log\left(1 + \frac{p_0 g_{00}}{N_0 + \sum_{j \in \mathcal{N}_0} p_j g_{0j}}\right) \text{ nats} \qquad \text{Eq. (16)}$$

where $N_0$ is the noise variance.

The goal of the distributed parameter update method is to maximize the summed capacity of all the cells 12 in the network 10 subject to a power constraint at each node and a certain minimal requirement constraint for the individual cells 12. Such constraint can be, for example, a limit on the highest interference each user terminal experiences. The interference may be expressed by the ratio:

$$\frac{p_j g_{0j}}{p_0 g_{00}} < \lambda \qquad \text{Eq. (17)}$$

The requirement is, therefore, to keep the ration given by Eq. (16) below a predetermined threshold λ for all nodes $j \in \mathcal{N}_0$.

The local cost function defined in Eq. (1) is chosen to be the negative of the capacity and is given by:

$$C_{\mathcal{A}_0}(p_j \mid j \in \mathcal{A}_0) = -R = \log\left(\frac{N_0 + \sum_{j \in \mathcal{N}_0} p_j g_{0j}}{N_0 + \sum_{j \in \mathcal{A}_0} p_j g_{0j}}\right) \qquad \text{Eq. (18)}$$

The local cost functions for any $j \in \mathcal{N}_0$, $C_{\mathcal{A}, A_j}$, can be similarly defined and the weighted and summed cost function given in Eq. (2) can be evaluated subsequently.

The partial derivatives of Eq. (18) can be easily derived, and are given by:

$$\frac{\partial}{\partial p_0} C_{\mathcal{A}_0}(p_j \mid j \in \mathcal{A}_0) = -\frac{g_{00}}{N_0 + \sum_{j \in \mathcal{A}_0} p_j g_{0j}} \text{ and} \qquad \text{Eq. (19)}$$

$$\frac{\partial}{\partial p_k} C_{\mathcal{A}_0}(p_j \mid j \in \mathcal{A}_0) = \frac{p_0 g_{00} g_{0k}}{\left(N_0 + \sum_{j \in \mathcal{A}_0} p_j g_{0j}\right)\left(N_0 + \sum_{j \in \mathcal{N}_0} p_j g_{0j}\right)}$$

for $k \in \mathcal{A}_0$, $k \neq 0$. With the local cost function defined and its partial derivative derived, the distributed parameter update procedures of FIG. 3, 4 or 5 can be carried out.

In some embodiments of the invention, the constraint given by Eq. (17) on highest interference level, the summed cost function over the range of valid α in the line search given in Eq. (6) and Eq. (14) can be closely approximated by a linear function, thereby further reducing the amount of information exchanged among neighboring nodes.

Figure 6:
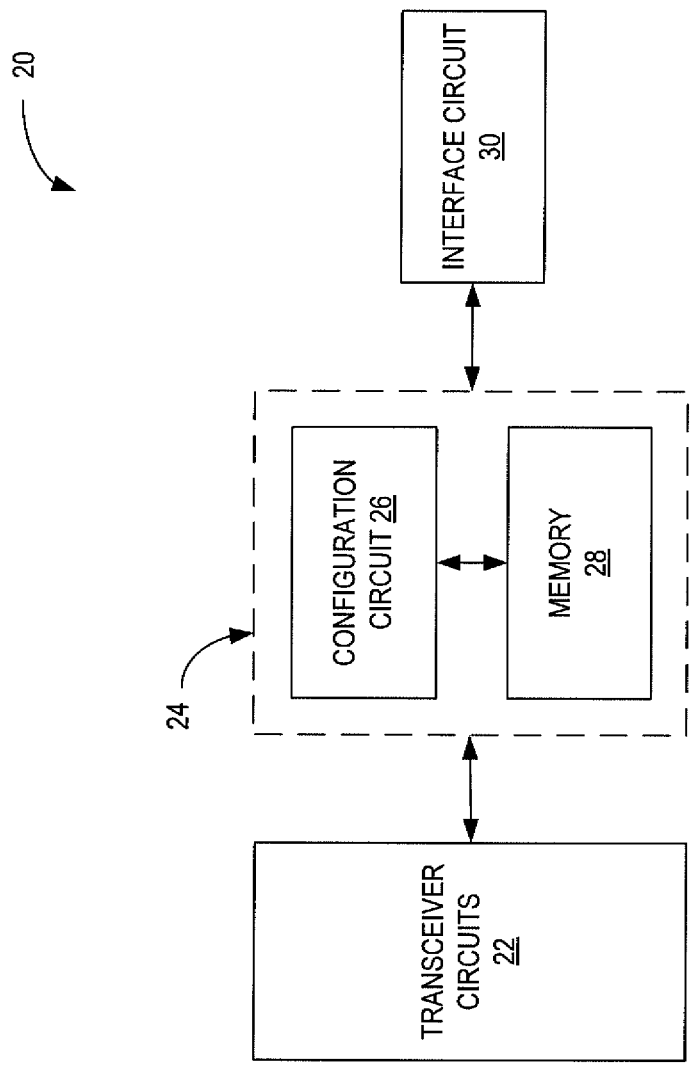
FIG. 6 illustrates an exemplary network node in the communication network.

FIG. 6 illustrates the main functional elements of an exemplary node 20 implementing the distributed parameter update method as herein described. The node 20 is a base station in a cell 12 of the communication network 10. The node 20 comprises transceiver circuits 22, control circuits 24, and an interface circuit 30. The transceiver circuits 22 comprise one or more receivers and transmitters for wirelessly communicating over an air interface with user terminals in the cell served by the node 20. The control circuit 24 includes a configuration processor 26 to determine a parameter setting for the node 20, and memory 28 for storing program instructions and data needed for operation. The configuration processor 26 may comprise one or more microprocessors, hardware, firmware, or a combination thereof. Memory 28 may comprise non-volatile memory, such as read-only memory. The interface circuits 30 are configured to connect with a signaling network and enable the exchange of cost functions and parameter settings with other nodes 20.

The disclosed embodiments of the present invention enable the use of a distributed parameter update procedure for parameters that can have a continuous value. The use of local impact functions in some embodiments requires the exchange of less information between network nodes as compared to a full description of the cost functions. Thus, bandwidth is conserved and latency is reduced. Further, the search of the parameter space is restricted to a line extending from the current parameter setting, requires fewer processing resources.

The present invention may be carried out in other ways than those specifically set forth herein without departing from essential characteristics of the invention. The disclosed embodiments are thus to be considered in all respects as illustrative and not restrictive, and all changes coming within the meaning and equivalency range of the appended claims are intended to be embraced therein.

What is claimed is:

1. A method of determining parameter settings for a network node in a communication network, the method comprising:
   receiving, at a network node, current parameter settings for each of one or more neighboring nodes in a local network of the network node;
   computing a gradient of a summed cost function for the network node as a function of the current parameter settings for the network node and its neighboring nodes;
   determining a revised parameter setting for the network node by searching a parameter space along the gradient of the summed cost function; and
   sending the revised parameter setting for the network node to the neighboring nodes.

2. The method of claim 1 wherein computing a gradient of a summed cost function comprises:
   receiving a partial derivative with respect to the network node of a local cost function for each of one or more of the neighboring nodes; and
   computing the gradient of a summed cost function for the network node based on the received partial derivatives of the local cost functions for the neighboring nodes.

3. The method of claim 2 wherein receiving a partial derivative with respect to the network node of a local cost function for each of one or more of the neighboring nodes comprises:
   exchanging current parameter settings with the neighboring nodes, wherein the network node receives current parameter settings for its neighboring nodes during the exchange;
   computing, at the network node, a partial derivative of a local cost function for the network node based on the current parameter settings of the neighboring nodes; and
   exchanging the partial derivatives computed by the network node with corresponding partial derivatives computed by the neighboring nodes based on the current parameter settings.

4. The method of claim 1 wherein determining a revised parameter setting for the network node comprises:
   receiving a local impact function for each of one or more of the neighboring nodes, wherein the local impact function from each neighboring node indicates a contribution of the parameter setting by the network node on a summed cost function for the neighboring node;
   determining a summed impact function for the network node based on the local impact functions for the neighboring nodes and a local impact function for the network node; and
   determining the revised parameter setting based on the summed impact function and the gradient of the summed cost function.

5. The method of claim 4 wherein receiving a local impact function for each of one or more of the neighboring nodes comprises:
   exchanging, with the neighboring nodes, the gradient of the summed cost function for the network node for corresponding gradients of the summed cost functions for the neighboring nodes;
   computing a set of local impact functions for the network node and the neighboring nodes based on the exchanged gradients of the summed cost functions; and
   exchanging, the local impact function computed by the network node for corresponding local impact functions computed by the neighboring nodes.

6. The method of claim 4 wherein determining a summed impact function for the network node comprises determining a weighted sum of the local impact functions for the neighboring nodes and the local impact function for the network node.

7. The method of claim 4 wherein determining the revised parameter setting based on the summed impact function and the gradient of the summed cost function comprises:
   determining a scalar that minimizes the summed impact function; and
   computing the revised parameter setting for the network node as a function of the scalar and the gradient of the summed cost function for the network node.

8. The method of claim 1 further comprising:
   receiving, at the network node, current parameter settings for each of one or more of the neighboring nodes; and
   determining the summed cost function for the network node based on the current parameter settings of the neighboring nodes.

9. The method of claim 8 wherein computing a gradient of a summed cost function for the network node at a current parameter setting for the network node comprises:
   determining a partial derivative of the summed cost function with respect to each of one or more variables in the parameter setting; and
   computing the gradient of the summed cost function for the network node as a function of the partial derivatives.

10. The method of claim 8 wherein determining a revised parameter setting for the network node comprises:
    searching the parameter space along the gradient of the summed cost function to find a scalar that minimizes the summed cost function; and
    computing the new parameter setting as a function of the gradient and the scalar.

11. The method of claim 1 wherein determining a revised parameter setting for the network node further comprises constraining the revised parameter setting to be a member of a predetermined set of parameter settings.

12. A method of determining parameter settings for a network node in a communication network, the method comprising:
    receiving, at a network node, current parameter settings for each of one or more neighboring nodes in a local network of the network node;
    determining a summed cost function for the network node based on the current parameter settings of the network node and the neighboring nodes;
    computing a gradient of the summed cost function at a current parameter setting for the network node;
    determining a revised parameter setting for the network node by searching a parameter space along the gradient of the summed cost function; and
    sending the revised parameter setting for the network node to the neighboring nodes in the local network of the network node.

13. The method of claim 12 wherein computing a gradient of a summed cost function for the network node comprises:

determining a partial derivative of the summed cost function with respect to each of one or more variables in the parameter setting; and
computing the gradient of the summed cost function for the network node as a function of the partial derivatives.

14. The method of claim 12 wherein determining a revised parameter setting for the network node comprises:
searching the parameter space along the gradient of the summed cost function to find a scalar that minimizes the summed cost function; and
computing the new parameter setting as a function of the gradient and the scalar.

15. The method of claim 12 wherein determining a revised parameter setting for the network node further comprises constraining the revised parameter setting to be a member of a predetermined set of parameter settings.

16. A method of determining parameter settings for a network node in a communication network, the method comprising:
exchanging current parameter settings between the network node and one or more neighboring nodes in a local network of the network node, wherein the network node receives current parameter settings for the neighboring nodes during the exchange;
computing, at the network node, partial derivatives of a local cost function for the network node with respect to each of the neighboring nodes as a function of the current parameter settings for the network node and the neighboring nodes;
exchanging, with the neighboring nodes, the partial derivatives computed by the network node for corresponding partial derivatives with respect of the network node computed based on the current parameter settings by the neighboring nodes;
computing a gradient of a summed cost function for the network node at a current parameter setting based on the partial derivatives received from the neighboring nodes;
exchanging, with the neighboring nodes, the gradient of the summed cost function for the network node for corresponding gradients of summed cost functions for the neighboring nodes;
computing, at the network node, a set of local impact functions for the network node and the neighboring nodes based on the gradients of the summed cost functions;
exchanging, the local impact functions computed by the network node for corresponding local impact functions computed by the neighboring nodes;
determining a summed impact function for the network node based on the local impact functions for the neighboring nodes and a local impact function for the network node;
determining a revised parameter setting based on the summed impact function and the gradient of the summed cost function; and
sending the revised parameter setting for the network node to the neighboring nodes in the local network of the network node.

17. The method of claim 16 wherein determining a summed impact function for the network node comprises determining a weighted sum of the local impact functions for the neighboring nodes and a local impact function for the network node.

18. The method of claim 17 wherein determining the revised parameter setting based on the summed impact function and the gradient of the summed cost function comprises:
determining a scalar that minimizes the summed impact function; and
computing the revised parameter setting for the network node as a function of the scalar and the gradient of the summed cost function for the network node.

19. The method of claim 16 wherein determining a revised parameter setting for the network node further comprises constraining the revised parameter setting to be a member of a predetermined set of parameter settings.

20. A network node in a communication network, the network node comprising:
a communication interface for communicating with one or more neighboring nodes in a local network of the network node; and
a configuration processor for determining a parameter setting for the network node, the configuration processor configured to:
receive current parameter settings for the neighboring nodes;
compute a gradient of a summed cost function for the network node at a current parameter setting for the network node as a function of the current parameter settings for the network node and the neighboring nodes;
determine a revised parameter setting for the network node by searching a parameter space along the gradient of the summed cost function; and
send the revised parameter setting for the network node to the neighboring nodes in the local network of the network node.

21. The network node of claim 20 wherein the network node is further configured to:
receive a partial derivative with respect to the network node of a local cost function for each of the neighboring nodes; and
compute the gradient of the summed cost function based on the received partial derivatives for the neighboring nodes.

22. The network node of claim 21 wherein the configuration processor is further configured to:
exchange current parameter settings with the neighboring nodes, wherein the network node receives current parameter settings for its neighboring nodes during the exchange;
compute a partial derivative of a local cost function for the network node based on the current parameter settings of the neighboring nodes; and
exchange the partial derivatives computed by the network node with corresponding partial derivatives computed based on the current parameter settings by the neighboring nodes.

23. The network node of claim 20 wherein the configuration processor is further configured to:
receive a local impact function for each of the neighboring nodes, wherein the local impact function for each neighboring node indicates a contribution of the parameter setting by the network node on a summed cost function for the neighboring node;
determining a summed impact function for the network node based on the local impact functions for the neighboring nodes and a local impact function for the network node; and
determine the revised parameter setting based on the summed impact function and the gradient of the summed cost function.

24. The network node of claim 23 wherein the configuration processor is further configured to:

exchange, with the neighboring nodes, the gradient of the summed cost function for the network node for corresponding gradients of the summed cost functions for the neighboring nodes;

compute a set of local impact functions for the network node and the neighboring nodes based on the exchanged gradients of the summed cost functions; and exchange the local impact function of the network node for corresponding local impact functions computed by the neighboring nodes.

25. The network node of claim 23 wherein the configuration processor is further configured to compute the summed impact function for the network node as a weighted sum of the local impact functions for the neighboring nodes and the local impact function for the network node.

26. The network node of claim 23 wherein the configuration processor is further configured to:

determine a scalar that minimizes the summed impact function; and compute the revised parameter setting for the network node as a function of the scalar and the gradient of the summed cost function for the network node.

27. The network node of claim 20 wherein the configuration processor is further configured to:

receive current parameter settings for the neighboring nodes; and determine the summed cost function for the network node based on the current parameter settings of the neighboring nodes.

28. The network node of claim 27 wherein the configuration processor is further configured to:

determine a partial derivative of the summed cost function with respect to each of one or more variables in the parameter setting; and compute the gradient of the summed cost function for the network node as a function of the partial derivatives.

29. The network node of claim 27 wherein the configuration processor is further configured to:

search the parameter space along the gradient of the summed cost function to find a scalar that minimizes the summed cost function; and compute the new parameter setting as a function of the gradient and the scalar.

30. The network node of claim 20 wherein the configuration processor is further configured to determine the revised parameter setting to be a member of a predetermined set of parameter settings.

31. A network node in a communication network, the network node comprising:

a communication interface for communicating with one or more neighboring nodes in a local network of the network node; and a configuration processor for determining a parameter setting for the network node, the configuration processor configured to:

receive current parameter settings for the neighboring nodes;

determine a summed cost function for the network node based on the current parameter settings of the network node and the neighboring nodes;

compute a gradient of the summed cost function at a current parameter setting for the network node;

determine a revised parameter setting for the network node by searching a parameter space along the gradient of the summed cost function; and send the revised parameter setting for the network node to the neighboring nodes in the local network of the network node.

32. The network node of claim 31 wherein the configuration processor is further configured to:

determine a partial derivative of the summed cost function with respect to each of one or more variables in the parameter setting; and compute the gradient of the summed cost function for the network node as a function of the partial derivatives.

33. The network node of claim 31 wherein the configuration processor is further configured to:

search the parameter space along the gradient of the summed cost function to find a scalar that minimizes the summed cost function; and compute the new parameter setting as a function of the gradient and the scalar.

34. The network node of claim 31 wherein the configuration processor is further configured to constrain the revised parameter setting to be a member of a predetermined set of parameter settings.

35. A network node in a communication network, the network node comprising:

a communication interface for communicating with one or more neighboring nodes in a local network of the network node;

a configuration processor for determining a parameter setting for the network node, the configuration processor configured to:

exchange current parameter settings with the neighboring nodes, wherein the network node receives current parameter settings for the neighboring nodes during the exchange;

compute partial derivatives of a local cost function for the network node with respect to each of the neighboring nodes as a function of the current parameter settings for the network node and the neighboring nodes;

exchange, with the neighboring nodes, the partial derivatives computed by the network node for corresponding partial derivatives with respect of the network node computed based on the current parameter settings by the neighboring nodes;

compute a gradient of a summed cost function for the network node based on the partial derivatives received from the neighboring nodes;

exchange, with the neighboring nodes, the gradient of the summed cost function for the network node for corresponding gradients of summed cost functions for the neighboring nodes;

compute, at the network node, a set of local impact functions for the network node and its neighboring nodes based on the gradients of the summed cost functions;

exchange the local impact functions computed by the network node for corresponding local impact functions computed by the neighboring nodes;

determine a summed impact function for the network node based on the local impact functions for the neighboring nodes and a local impact function for the network node; and determine a revised parameter setting based on the summed impact function and the gradient of the summed cost function.

36. The network node of claim 35 wherein the configuration processor is further configured to compute the summed impact function as a weighted sum of the local impact functions for the neighboring nodes and a local impact function for the network node.

37. The network node of claim 36 wherein the configuration processor is further configured to:
   determine a scalar that minimizes the summed impact function; and
   compute the revised parameter setting for the network node as a function of the scalar and the gradient of the summed cost function for the network node.

38. The network node of claim 35 wherein the configuration processor is further configured to constrain the revised parameter setting to be a member of a predetermined set of parameter settings.

* * * * *

UNITED STATES PATENT AND TRADEMARK OFFICE
CERTIFICATE OF CORRECTION

PATENT NO.        : 8,934,930 B2
APPLICATION NO.   : 13/283003
DATED             : January 13, 2015
INVENTOR(S)       : Guey et al.

It is certified that error appears in the above-identified patent and that said Letters Patent is hereby corrected as shown below:

In the drawings

In Fig. 5, Sheet 5 of 6, for Tag "335", in Line 1, delete "IMAPCT FUCTIONS" and insert -- IMPACT FUNCTIONS --, therefor.

In the specification

In Column 2, Line 48, delete "nodes The" and insert -- nodes. The --, therefor.

In Column 4, Line 40, delete "multiple output" and insert -- multiple-output --, therefor.

In Column 5, Line 27, in Equation 1, delete "$C_{\mathcal{X}_i}(ip_j | \epsilon \mathcal{A}_i)=$" and insert -- $C_{\mathcal{A}_i}(\mathbf{p}_j | j \in \mathcal{A}_i) = C_{\mathcal{A}_i}(\mathbf{p}_i, \mathbf{p}_j | j \in \mathcal{N}_i)$ --, therefor.

In Column 6, Line 47, delete "a that" and insert -- α that --, therefor.

In Column 6, Line 49, delete "a value" and insert -- α value --, therefor.

In Column 10, Line 18, delete "$C_{\mathcal{X}_i, \mathcal{A}_j}$" and insert -- $C_{\mathcal{A}_j}$ --, therefor.

Signed and Sealed this
Sixteenth Day of February, 2016

Michelle K. Lee
*Director of the United States Patent and Trademark Office*